United States Patent
De Oliveira

(10) Patent No.: US 8,056,527 B2
(45) Date of Patent: Nov. 15, 2011

(54) SPLIT-CHAMBER ROTARY ENGINE

(76) Inventor: Egidio L. De Oliveira, Arden, NC (US)

(*) Notice: Subject to any disclaimer, the term of this patent is extended or adjusted under 35 U.S.C. 154(b) by 343 days.

(21) Appl. No.: 12/292,465

(22) Filed: Nov. 19, 2008

(65) Prior Publication Data

US 2010/0122684 A1 May 20, 2010

(51) Int. Cl.
  F02B 53/04 (2006.01)
  F02B 53/00 (2006.01)
  F01C 1/00 (2006.01)
  F04C 18/00 (2006.01)
  F04C 2/00 (2006.01)

(52) U.S. Cl. ......... 123/223; 123/204; 123/236; 418/260

(58) Field of Classification Search .......... 123/200–249; 418/260
  See application file for complete search history.

(56) References Cited

U.S. PATENT DOCUMENTS

| | | | | | |
|---|---|---|---|---|---|
| 1,023,872 | A | * | 4/1912 | Pearson | 418/260 |
| 1,042,595 | A | * | 10/1912 | Pearson | 418/260 |
| 1,174,439 | A | * | 3/1916 | Pelley | 60/39.44 |
| 1,201,836 | A | * | 10/1916 | Lennen | 60/39.44 |
| 1,242,692 | A | * | 10/1917 | Williams | 418/113 |
| 1,245,154 | A | * | 11/1917 | Faessler | 123/223 |
| 1,309,735 | A | * | 7/1919 | Henig | 123/223 |
| 1,351,933 | A | * | 9/1920 | Van Osdel | 123/223 |
| 1,368,359 | A | * | 2/1921 | Scott | 123/223 |
| 1,369,070 | A | * | 2/1921 | Williams et al. | 123/223 |
| 1,556,600 | A | * | 10/1925 | Hardy | 123/223 |
| 2,112,844 | A | * | 4/1938 | Howard | 123/244 |
| 2,354,486 | A | * | 7/1944 | Spitzer | 418/122 |
| 2,399,998 | A | * | 5/1946 | Fox | 123/223 |
| 3,057,157 | A | * | 10/1962 | Close | 123/204 |
| 3,073,118 | A | * | 1/1963 | August | 123/213 |
| 3,137,280 | A | * | 6/1964 | Jacobson et al. | 123/228 |
| 3,204,616 | A | * | 9/1965 | Eastman | 123/214 |
| 3,215,129 | A | | 11/1965 | Johnson | |
| 3,398,725 | A | * | 8/1968 | Null | 123/227 |

(Continued)

FOREIGN PATENT DOCUMENTS

DE 4029144 3/1992

(Continued)

OTHER PUBLICATIONS

Website, http://rotarynews.com/node/view/872, article on the RadMax rotary engine, six sheets printed from the internet on Jul. 25, 2008.

*Primary Examiner* — Thai Ba Trieu
(74) *Attorney, Agent, or Firm* — Richard C. Litman

(57) ABSTRACT

The split-chamber rotary engine includes a rotary power module having a case with a circular rotor installed therein. At least one, and preferably two or more combustion chambers are formed peripherally in the rotor. The generally circular rotor cavity of the case includes at least one, and preferably two or more, peripheral expansion chambers. A corresponding number of reciprocating compressor modules are installed upon the case, with the compressor module axis being aligned generally tangentially to the rotor periphery. The compressor module includes concentric reciprocating pistons and valves that compress the air charge and transfer the compressed charge to the rotary power module for power production. The compressor module is driven purely by combustion gas pressure acting upon its inboard piston. No mechanical linkage exists from power module to compressor module. The engine may include multiple rotor and case rows, as desired.

20 Claims, 11 Drawing Sheets

U.S. PATENT DOCUMENTS

| | | | |
|---|---|---|---|
| 3,429,301 A * | 2/1969 | Sandidge | 123/227 |
| 3,596,641 A | 8/1971 | Hofmann | |
| 3,987,762 A | 10/1976 | Sawada | |
| 5,092,752 A | 3/1992 | Hansen | |
| 5,251,595 A | 10/1993 | Wei-Min | |
| 5,681,157 A | 10/1997 | Wen-Ming | |
| 6,347,611 B1 * | 2/2002 | Wright | 123/237 |
| 6,349,695 B1 | 2/2002 | Lee | |
| 6,799,549 B1 * | 10/2004 | Patterson et al. | 123/204 |
| 7,849,832 B2 * | 12/2010 | Huettlin | 123/226 |
| 2001/0036411 A1 * | 11/2001 | Walker | 417/204 |
| 2006/0102139 A1 | 5/2006 | Fernandez Garcia | |
| 2008/0121207 A1 | 5/2008 | Pelov | |
| 2010/0006059 A1 * | 1/2010 | Tradler | 123/241 |

FOREIGN PATENT DOCUMENTS

| | | |
|---|---|---|
| FR | 2643945 | 9/1990 |
| GB | 2218467 | 11/1989 |
| JP | 63-285224 | 11/1988 |
| JP | 64-080721 | 3/1989 |
| JP | 02-049927 | 2/1990 |

* cited by examiner

SPLIT-CHAMBER ROTARY ENGINE

BACKGROUND OF THE INVENTION

1. Field of the Invention

The present invention relates generally to internal combustion engines, and particularly to a split-chamber rotary engine that combines mechanically independent rotary and reciprocating features, including a rotary power module with one or more reciprocating compressor modules.

2. Description of the Related Art

Innumerable different configurations of internal combustion engines and expansion motors have been developed in the past. The reciprocating piston internal combustion engine commonly known as the piston engine in its various forms (e.g., two-stroke and four-stroke spark, diesel ignition, etc.) has been accepted overwhelmingly as the engine configuration of choice for nearly all stationary and mobile applications. The refinement of the reciprocating piston engine since its inception has resulted in such engines developing smooth power and having great reliability, in most cases, as well as being simple to operate during normal use.

Nonetheless, the reciprocating piston internal combustion engine principle, by its nature, is not particularly efficient. The major problem is that this engine configuration combines the function of an air compressor for drawing in and compressing the intake charge and expelling the exhaust gases with the function of an expansion motor for using the power produced by the combustion of the air and fuel mixture in a single chamber. The air compression function is reasonably efficient, as the piston force and compression requirement are well matched with one another during the compression stroke.

However, the power stroke of the reciprocating piston engine is relatively inefficient. This is due to the basic design of the mechanism, which causes the expansive force of the heated combustible mixture to develop its greatest force at very nearly the top position of the piston, called top dead center. When the piston is at top dead center, the torque arm defined by the crankshaft throw is zero, and thus no torque is developed, regardless of the force developed upon the piston in the combustion chamber. As the crankshaft rotates, the torque arm increases from zero to a maximum at 90 degrees from top dead center. However, here the piston is at midstroke and the energy of the mixture is about half-spent. Also, friction between the sides of the piston and its piston rings and the cylinder wall is at its greatest at this point, due to the angular offset of the connecting rod. The overall result is an engine configuration that is not optimized for efficiency.

In response to the above considerations, other internal combustion engine configurations have been developed, the majority of these being of the rotary type. Among the rotary internal combustion engines the most successful is the Wankel engine. The classic Wankel configuration with two chamber lobes and a three-sided rotor develops relatively low torque at high rpm, requiring torque multiplication and speed reduction in the form of transmissions, gear reduction differentials, etc. While the modern reciprocating engine also develops its maximum torque at relatively high rpm in order to overcome some of the inefficiencies noted further above, the need for much higher rpm for the production of reasonable torque output is a negative characteristic of the Wankel type rotary engine.

A number of variations of rotary configuration internal combustion engines have been developed in the past, as noted further above. An example of such is found in Japanese Patent No. 63-285,224, published on Nov. 22, 1988. This reference describes (according to the drawings and English abstract) a rotary engine having a case with a cam-shaped rotor therein. The case includes radially sliding vanes therein for defining the internal operating volumes of the engine. Conventional poppet intake and exhaust valves are provided.

Japanese Patent No. 1-080,721, published on Mar. 27, 1989, describes (according to the drawings and English abstract) another rotary engine having cam-shaped rotors therein with radially sliding vanes extending through the peripheral wall of the stationary case.

Japanese Patent No. 2-049,927, published on Feb. 20, 1990, describes (according to the drawings and English abstract) another rotary engine having radially sliding vanes extending through the peripheral wall of the stationary case, with the inner tips of the vanes bearing against the periphery of the non-circular rotor within the case.

French Patent No. 2,643,945, published on Sep. 7, 1990, describes (according to the drawings and English abstract) a rotary engine with two laterally joined chambers, each having a rotor with radially extending vanes therein. One rotor and chamber acts as a compressor, with the compressed charge passing to the second rotor via a periodically opened passage timed to permit the flow from compressor to combustion chamber at the proper time.

German Patent No. 4,029,144, published on Mar. 12, 1992, describes (according to the drawings and English abstract) a rotary engine having a case with a circular internal volume and a smaller diameter rotor eccentrically installed therein. The rotor has a series of radially extending and retracting vanes to define a series of variable volume working chambers between the outer circumference of the rotor and the inner circumference of the case.

None of the above inventions and patents, taken either singly or in combination, is seen to describe the instant invention as claimed. Thus a rotary engine solving the aforementioned problems is desired.

SUMMARY OF THE INVENTION

The split-chamber rotary engine includes a case having a rotor cavity with at least one combustion chamber and at least one expansion chamber therein, and a rotary power module having a rotor and at least one peripheral combustion chamber formed therein. The rotor preferably includes two or more such chambers evenly distributed for balance purposes and to increase the number of power events per revolution. At least one reciprocating compressor module communicates with the combustion chamber of the case and rotor, with the compressor module including a series of concentric pistons and valves that serve to draw in and compress intake air and transfer that intake charge to the combustion chamber defined by the periphery of the rotor and the inboard end of the compressor module piston assembly extending into a combustion chamber piston passage in the case. Thus, the rotary engine has a split combustion chamber, with approximately half of the chamber contained within the rotor periphery, and the other portion of the chamber contained within the case adjacent to the inboard end of the compressor piston.

The compressor module of the engine communicates only pneumatically with the rotor, with all operation of the compressor module resulting from differential pressures developed in the compressor portion of the combustion chamber as the engine operates. No mechanical linkage exists between the moving parts of the compressor and rotor modules. The engine may be developed in a number of different configurations having single or multiple rotor combustion chambers and/or single or multiple compressor modules, as desired.

Because of the configuration of the split-chamber rotary engine, with its separate compression and power modules, multiple power events can occur with each rotation of the rotor, depending upon the number of combustion chambers built into the rotor and the number of compression modules provided, as well as the number of rotors in a multiple rotor configuration. This increases the torque output of the engine at relatively low rpm when compared to conventional engines. The ability to selectively engage a multiplicity of rotors and compressor modules besides selectively triggering combustion for the individual rotor chambers by simple control devices enable this engine to operate efficiently over a wide range of power demands, thus eliminating the need for mechanical gear boxes.

The split-chamber rotary engine has no wasted motion of reciprocating components and corresponding wasted fuel. The rotary engine is also highly resistant to detonation, as the opposing walls of the compression piston and rotor chamber are free to move and absorb shock waves. Fuel is introduced via a direct injection system at the combustion chamber, mixing with the air charge contained therein. These characteristics allow the use of fuels having relatively low octane or anti-knock ratings, as well as relatively heavy and low cost fuel oils, to operate the engine. Alternatively, one or more carburetors may be installed externally to the compressor, if some sacrifice of efficiency is acceptable.

The engine cannot reverse-fire due to the configuration of the combustion chamber(s) in the rotor and the placement of the compressor module and its combustion chamber relative to the exhaust port of the rotor case. As this engine configuration has no mechanical linkage between the rotor and the compressor module(s), the engine will also free wheel with little internal drag when loaded externally with no power requirement. The engine may be constructed in various sizes and scales, from very small units for powering model aircraft to motorcycles, automobiles, trucks, trains, earth moving machinery, helicopters, airplanes and very large units serving as stationary power plants, or for maritime use.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The rotary engine has a power module that comprises a rotor disposed within a case and at least one compression module that comprises a reciprocating piston assembly actuated by pneumatic or combustion pressure from the power module. The engine may have various embodiments that differ according to different numbers of combustion chambers within the rotor, different numbers of compression modules, and/or single or multiple rows of compression and power modules, as desired.

Figure 1:
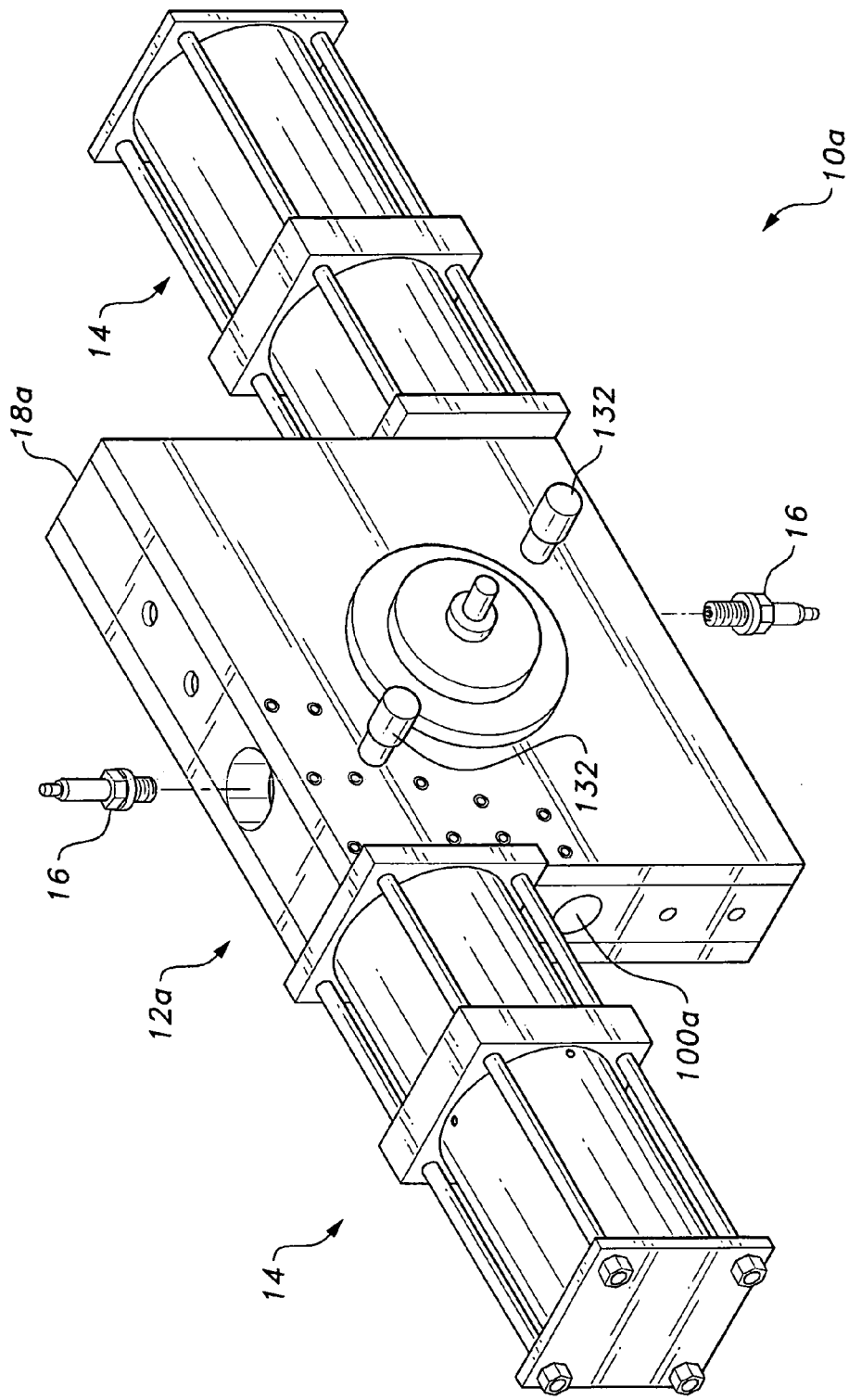
FIG. 1 is a perspective view of a first embodiment of a split-chamber rotary engine according to the present invention, showing its general configuration.

FIG. 1 provides a perspective view of a first embodiment of the engine 10a, having a power module 12a with two identical compression or compressor modules 14. Conventional spark plugs 16, or glow plugs for starting in a diesel engine, are provided, with one spark plug or glow plug 16 located at the juncture of each compressor module with the rotor chamber within the power module 12a, discussed further below. The power module 12a comprises a case 18a having a rotor therein, e.g. rotor 20a, a portion of which is shown in FIG. 2 of the drawings.

Figure 2:
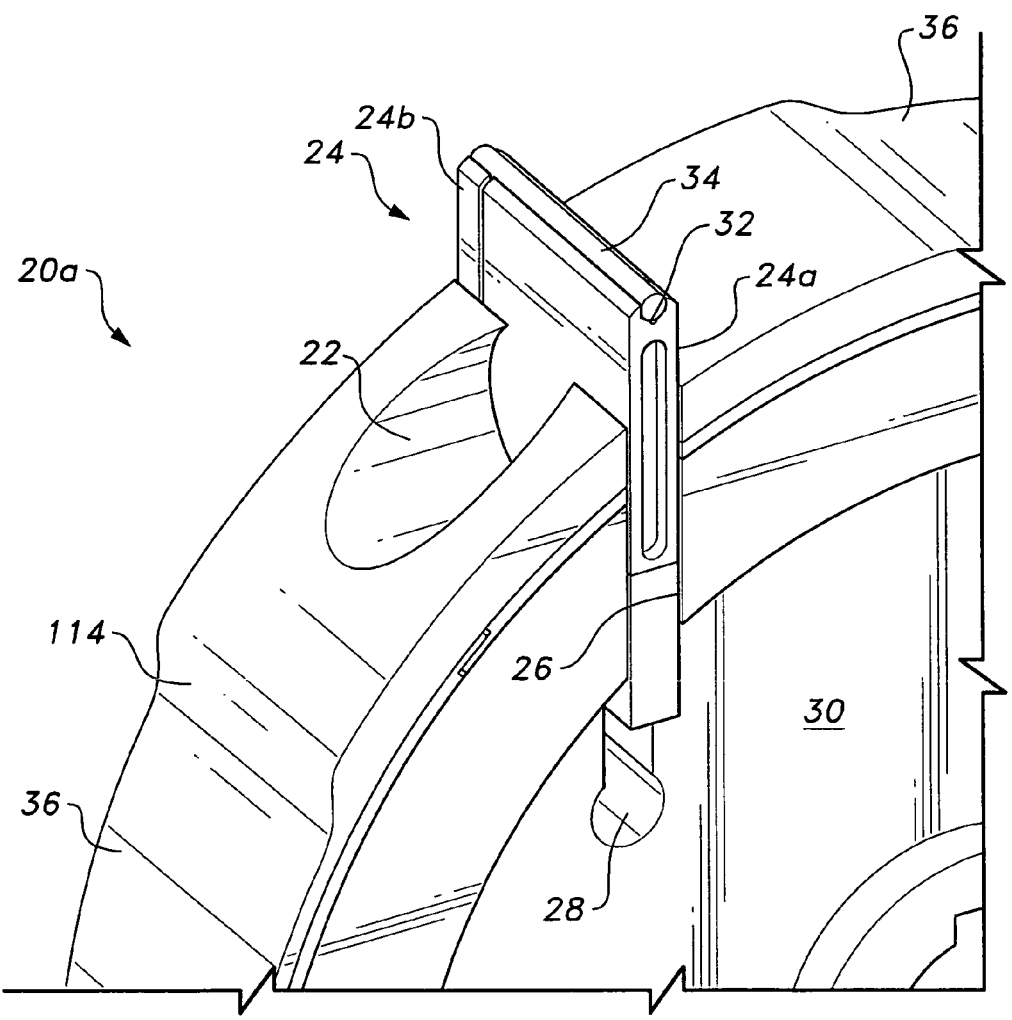
FIG. 2 is a broken away detailed perspective view of a portion of the rotor of the engine of FIG. 1, showing the rotor portion of the combustion chamber and the rotor seals.

The rotor 20a of FIG. 2 includes a combustion chamber portion 22 set into the peripheral portion of the rotor 20a, with the leading end of the combustion chamber portion 22 defined by a rotor vane 24 disposed within a slot 26 formed in the rotor 20a. The slot 26 includes a lower vane pressurizing passage 28 therein, which communicates pneumatically with the recessed face 30 of the rotor 20a; the face may be recessed on both sides of the rotor 20a. The purpose of this vane pressurizing passage 28 is explained further below, in the description of the starting sequence. The slot 26, and thus the vane 24, is oriented along a secant of the generally circular rotor 20a. The vane 24 includes two basic components 24a and 24b, which can slide laterally relative to one another to completely fill and seal the width of the rotor chamber within the case 18a.

The tip seal edge 32 of the rotor vane 24 is concave, and includes a cylindrical roller tip seal 34 residing therein, with the roller tip seal 34 rotating within the concave tip seal edge 32 of the vane 24 as the tip seal 34 bears against the case 18a wall during engine operation. The rotor 20a further includes a peripheral recess 36 through which combustion gases flow after the ignition event to an expansion chamber formed in the case wall, discussed in detail further below.

Figure 3:
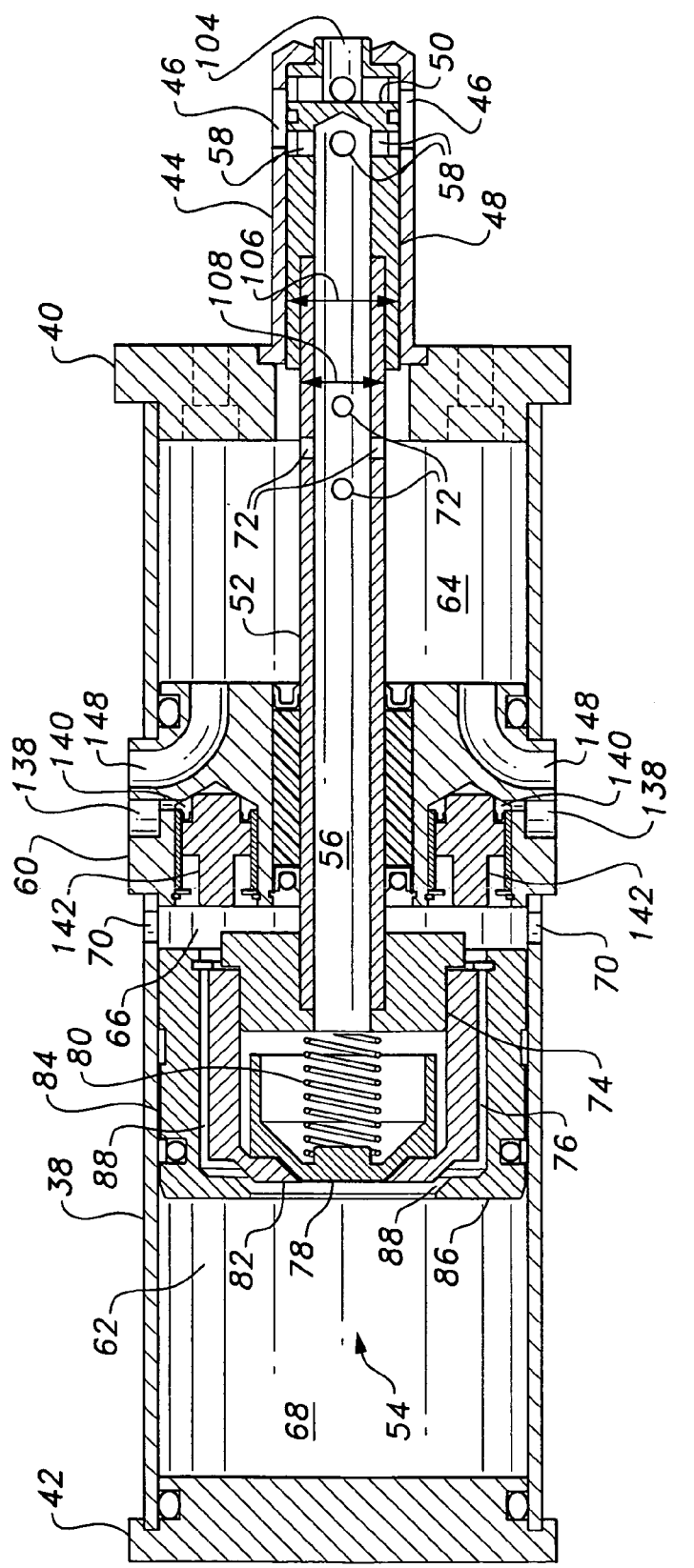
FIG. 3 is a side elevation view in section of a single compressor module of the engine of FIG. 1, showing various internal details thereof.

FIG. 3 of the drawings provides a cross sectional view of an exemplary compressor module 14, showing its internal structure in detail. The compressor module 14 extends from a corresponding combustion chamber piston passage extending from the rotor chamber to the exterior of the case, e.g., case 18b, as shown in drawing FIGS. 4A through 4D and discussed further below. The compressor module 14 includes an outer compressor cylinder 38 having a case attachment end 40 mechanically attached and sealed to the case 18b as shown e.g. in FIG. 4A, and an opposite closed distal end 42. A combustion piston sleeve 44 extends from the case attachment end 40 and resides within the piston passage of the case, as shown in e.g. FIGS. 4A through 4D. The sleeve 44 includes at least one, and preferably a series of passages 46 in its inboard end, i.e., the end adjacent the rotor chamber of the case when the compressor module 14 is installed thereto. A combustion piston 48 reciprocates within the sleeve 44, with the combustion piston 48 having a head 50 defining one end or wall of the combustion chamber.

A connecting rod 52 extends distally from the combustion piston 48, and connects the combustion piston rigidly to a compressor piston assembly 54 disposed within the compressor module cylinder 38. The connecting rod 52 has a hollow axial passage 56 to provide for the flow of intake gas from the distal portion of the cylinder 38 to the combustion chamber. Outlet ports 58 are provided through the wall of the combustion piston 48 to allow intake gas to flow from the axial passage 56 of the connecting rod 52, through the sleeve passages 46, and into the combustion chamber when the combustion piston 48 is position to align the ports or passages 46 and 58 during engine operation.

The connecting rod 52 passes through a divider 60 installed generally medially within the compressor cylinder 38, with the divider 60 separating the interior volume of the cylinder 38 into a first volume 62 and a second volume 64. The compressor piston assembly 54 is installed within the first volume 62, and further separates that first volume into variable volume intake and compression volumes, respectively 66 and 68. One or more intake passages 70 extend through the wall of the cylinder 38 into the intake volume 66, between the divider 60 and compressor piston assembly 54. The connecting rod 52 further includes one or more radial passages 72 extending through the wall thereof, allowing intake gases to pass through the hollow axial passage 56 of the connecting rod 52 and into the second volume 64 of the compressor module 14. The gas flow route through the complete compressor module and engine is described in detail further below.

Figure 4A:
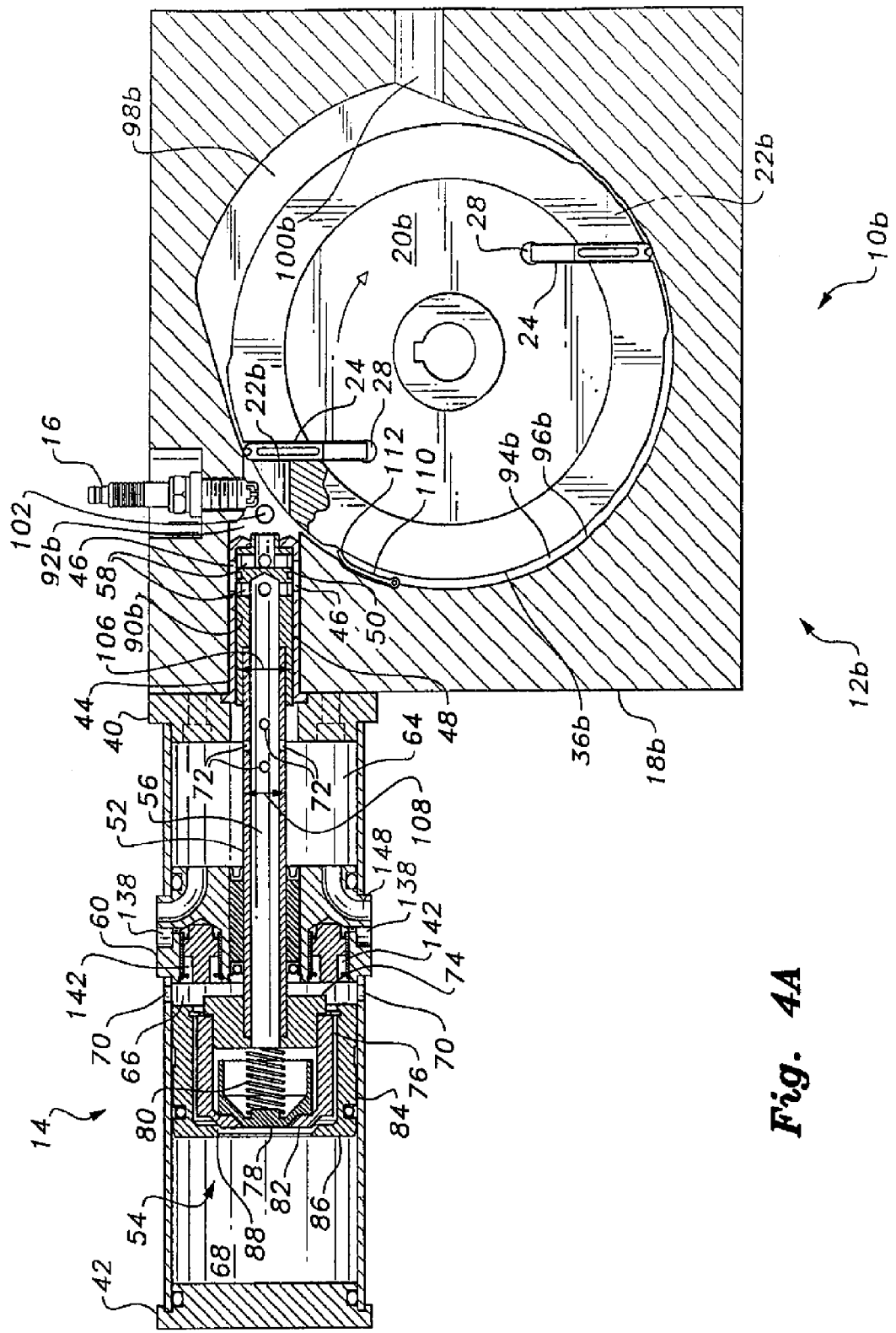
FIG. 4A is a side elevation view in section of a single compressor module rotary engine according to the present invention at the initiation of the combustion and power portion of the engine operating cycle.

The compressor piston assembly 54 includes a plug 74 affixed and sealed to the distal end of the connecting rod or shaft 52, with a hollow inner piston 76 affixed (e.g., threaded, etc.) and sealed to the plug 74. The plug 74 has an open center to fit about the end of the connecting rod 52, with the hollow interior of the inner piston 76 communicating with the hollow axial passage 56 of the rod or shaft 52. A poppet valve 78 is installed concentrically within the inner piston 76, with a spring 80 urging the valve 78 closed against the seat formed in the otherwise open head or crown 82 of the inner piston 76. When the valve 78 is open, as shown in FIG. 4C, the intake charge compressed within the compression volume 68 can flow through the center of the inner piston 76 and into the interior 56 of the connecting rod 52 for transfer to the combustion chamber, as discussed further below.

The inner piston 76 and its poppet valve 78 are surrounded concentrically by an outer sleeve 84 that slides within the cylinder 38 during the operational cycles of the engine. The outer sleeve 84 has limited axial motion relative to the inner piston 76, and acts as another airflow control valve. When the inner piston 76 moves away from the distal end 42 of the cylinder, the outer sleeve 84 lags behind because of friction and a gap is opened between the head or crown 82 of the inner piston 76 and the head 86 of the outer sleeve 84, as shown in FIGS. 3, 4A, and 4D. This allows fluid (e.g., intake air) to flow from the intake volume 66 through a circumferential passage 88 between the inner piston 76 and the outer sleeve 84, into the compression volume 68 of the cylinder 62.

FIGS. 4A through 4D provide cross sectional views of a second embodiment 10b of the engine, and show the general operating cycle of the engine. The engine 10b of FIGS. 4A through 4D functions essentially similarly to other engine configurations of the present invention but includes only a single compressor module 14 attached to a rotary power module 12b. The rotor case 18b accordingly includes only a single combustion chamber piston passage 90b and combustion chamber 92b therein, with the combustion piston sleeve 44 and its piston 48 installed within the piston passage 90b.

The rotor case 18b contains an internal rotor volume 94b therein, defined by a rotor chamber wall 96b. The rotor volume 94b is generally circular, but includes an expansion chamber 98b extending from a point somewhat beyond the combustion chamber 92b to the exhaust passage or port 100b. The number of case combustion chambers, expansion chambers, and exhaust ports correspond exactly to the number of compression modules 14 installed.

FIG. 4A shows the rotor position at essentially the point of ignition and the beginning of the combustion event in the operating cycle. It will be seen in FIG. 4A that the combustion chamber 92b of the case 18b is aligned with the first of the two rotor combustion chamber portions 22b to form a complete combustion chamber for the ignition and initial fuel-air mixture combustion event. At this point, fuel is injected through the injector port 102 and the spark plug 16 is fired to ignite the fuel-air mixture in the combined combustion chamber comprising rotor chamber portion 22b and case chamber portion 92b. Alternatively, the engine may use essentially a diesel system with autoignition after an initial glow plug startup is accomplished. As another alternative, the fuel may be introduced externally at the inlet port 70 of the compression module 14 and the injection system may be deleted, if an engine of somewhat lower efficiency is acceptable.

Figure 4B:
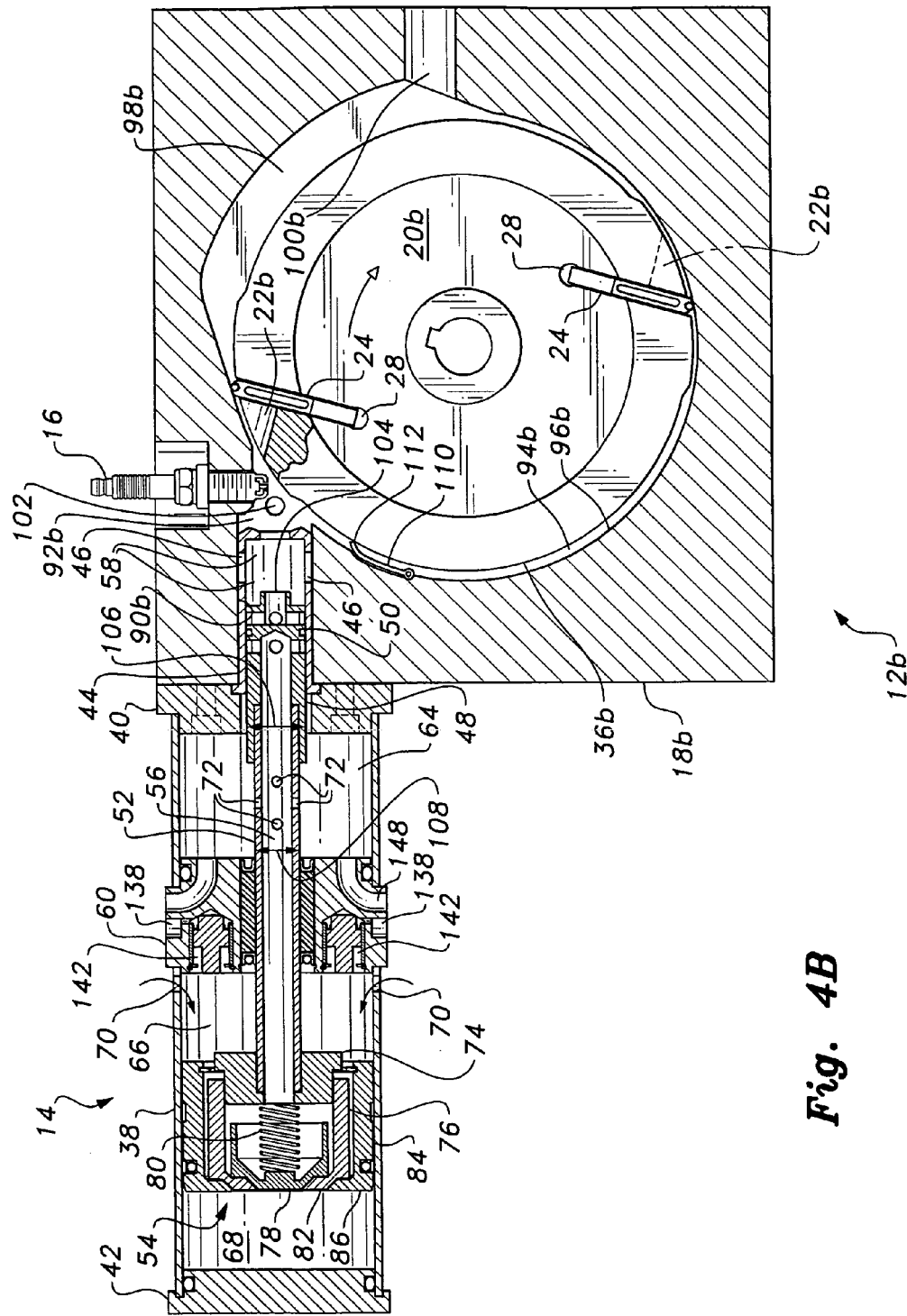
FIG. 4B is a side elevation view in section of the engine of FIG. 4A, showing the progression of the power portion of the engine operating cycle.
Figure 4C:
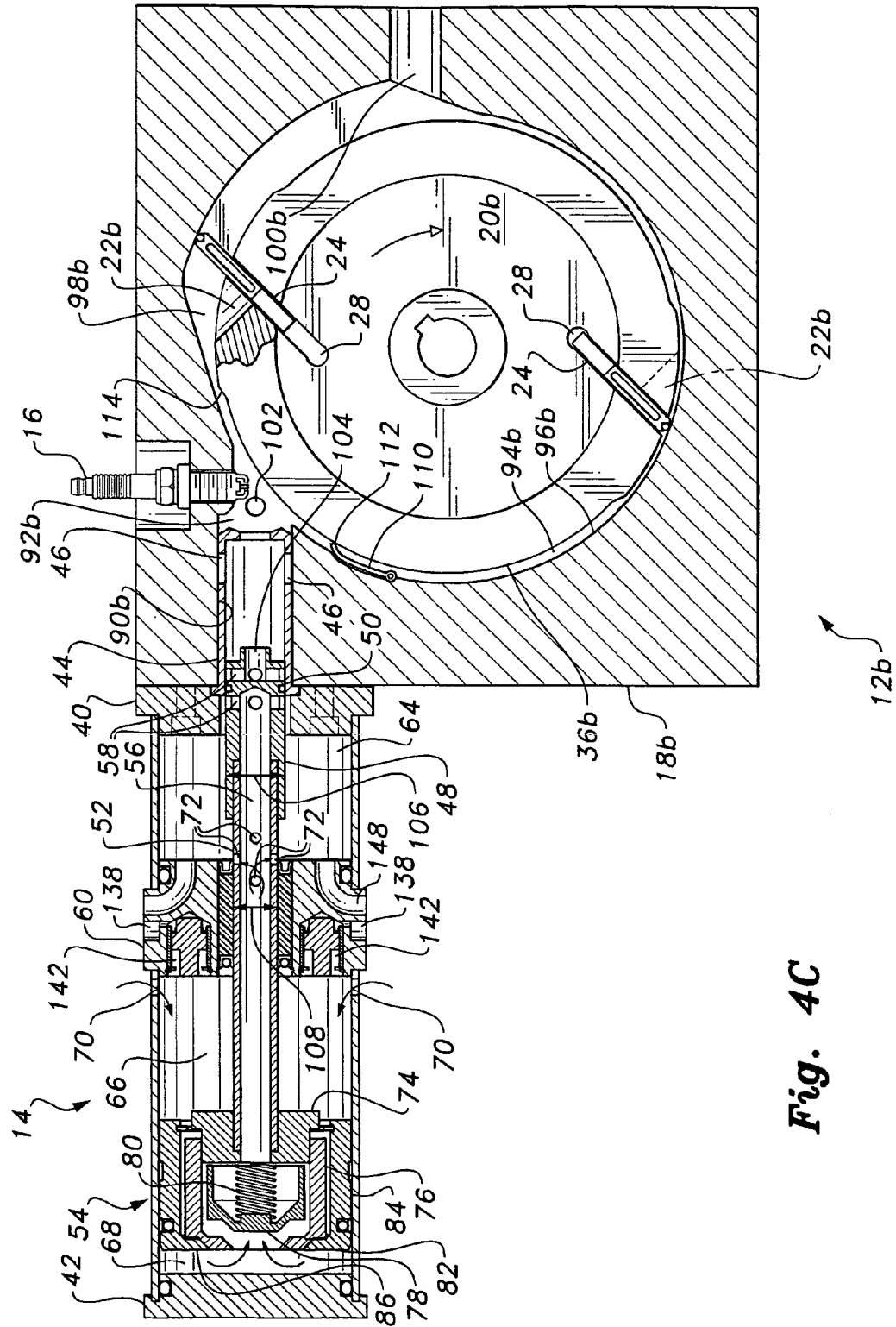
FIG. 4C is a side elevation view in section of the engine of FIGS. 4A and 4B, showing the increasing size of the expansion chamber and the operation of the compressor module charging compressed air into the reservoir.
Figure 4D:
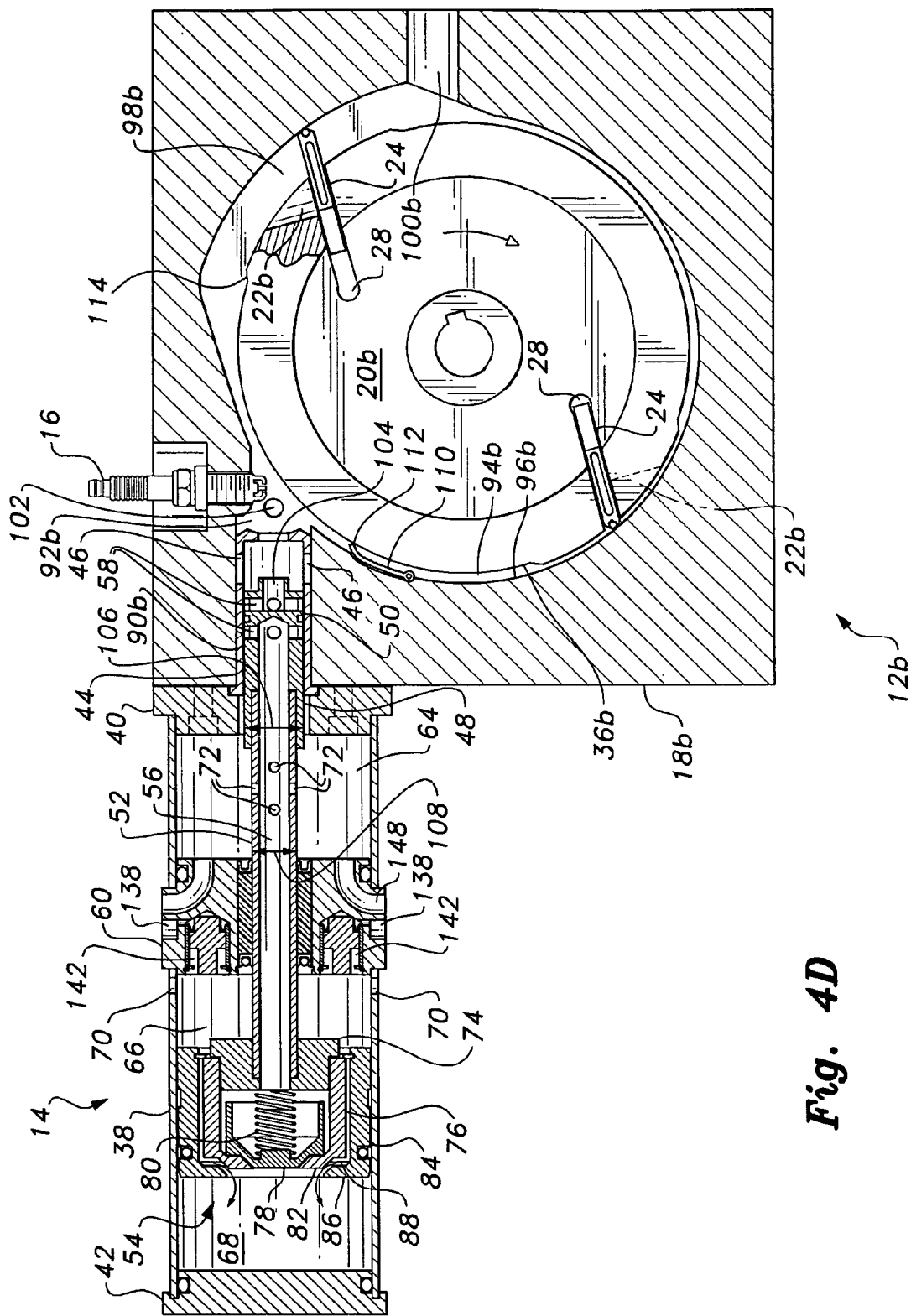
FIG. 4D is a side elevation view in section of the engine of FIGS. 4A through 4C, showing the further increase in volume of the expansion chamber and the operation of the compressor module drawing in fresh air for compression and charge of the next cycle, as the rotor vane approaches the exhaust port.

FIG. 4B shows the position of the rotor 20b in the case 18b shortly after the ignition event, as the combustion gases are expanding. The force developed by the combustion process forces the combustion piston away from the rotor 20b and toward the distal closed end 42 of the compressor module 14. This drives the compressor piston assembly 54 toward the distal end 42 of the compressor module, reducing the compression volume 68 and compressing the next intake charge therein. The force exerted upon the compressor piston causes a reaction to develop over the rotor, which, according to the second law of Newton, is equal and opposite to the force on the piston. This reaction force causes the rotor to gyrate in the opposite direction of the piston movement.

As the compressor piston assembly 54 is driven towards the distal end 42 of the compressor module, the compression volume 68 is reduced and the intake volume 66 is simultaneously increased, thus drawing a subsequent intake charge through the intake passages or ports 70, as shown by the intake arrows. The passage between the sleeve 84 and inner piston 76 remains closed due to the relatively high pressure from the combustion piston 48 forcing the connecting rod or shaft 52 and its attached plug 74 and inner piston 76 into the compression volume 68, while the increased pressure in the reduced compression volume 68 retards the motion of the sleeve 84 in that direction. The poppet valve 78 also remains closed against the inside of the head 82 of the inner piston 76 due to the pressure difference across the face of the poppet, thus compressing the next intake charge in the compression volume 68.

Simultaneously with the above, the clockwise rotation of the rotor 20*b* from its position as shown in FIG. 4A results in the splitting of the two combustion chamber portions 22*b* and 92*b* from one another. It will be seen that in the rotor position shown in FIG. 4B, there is little communication between the rotor combustion chamber portion 22*b* and the case combustion chamber portion 92*b*.

As the compression piston assembly 54 is driven towards its maximally distal travel, the pressure within the compression volume 68 increases, overcoming the weak force of spring 80 and the pressure within the second volume 64 and causing the poppet valve 78 to open, as shown in FIG. 4C. The opening of the poppet allows the compressed intake charge to flow through the top and into the interior of the inner piston 76 between the poppet valve 78 and the wall of the inner piston 76 to enter the hollow interior 56 of the connecting rod or shaft 52. Sufficient clearance is provided along the skirt and base of the poppet valve 78 to provide for such flow. The intake charge then enters the second volume 64 of the compression module cylinder 38, through the connecting rod ports or passages 72. Charging of the second volume 64 continues until the forces that opened the poppet are reduced below the opening value. The poppet valve 78 closes, trapping the air contained within the compression volume 68.

At this point in the operating cycle the residual combustion pressure within the case combustion chamber portion 92*b*, which extends into the now open volume of the combustion piston sleeve 44, is relatively low. This is because a substantial amount of gases from 92*b* have passed through the recess on the rotor into the expansion chamber 98*b*. The pressure within the second volume 64 exceeds that in the combustion chamber portion 92*b*. The trapped air within the compression volume 68 acts as an air spring, first absorbing the kinetic energy of the piston assembly, then pushing back the compression piston assembly 54 and all its associated parts. It will be noted that the diameter 106 of the combustion piston 48, and thus its subtended area, is somewhat larger than the diameter 108 and corresponding subtended area of the connecting rod or shaft 52. This results in the pressure within the second volume 64 acting upon the annulus of the larger diameter 106 of the combustion piston 48 to push the combustion piston 48 back into its sleeve 44 toward the combustion chamber portion 92*b*.

As the above return of the combustion piston 48 toward the case combustion chamber portion 92*b* is occurring, the rotor 20*b* is continuing to rotate. The rotation is assisted by combustion gas expansion along the peripheral recess 36*b* of the rotor 20*b*. Pressurized combustion gas flow extends in both directions between the rotor periphery and the case wall 96*b*, but is blocked in the counterclockwise direction by a chamber vane 110 resiliently attached to and extending inwardly from the case wall 96*b*. The chamber vane 110 is formed of a relatively thin, flexible metal, and includes a rotor contact edge 112 bearing against the peripheral surface of the rotor 20*b*. Thus, combustion gas cannot pass along the peripheral recess 36*b* between the rotor periphery and the case wall 96*b* in a direction opposing rotation of the rotor. However, no such blocking vane is provided in the direction of rotation of the rotor, thus allowing combustion gas pressure to bear against the leading end 114 of the peripheral recess 36 to cause the rotor 20*b* to rotate in the desired clockwise direction. It will be noted that the first rotor vane 24 is extended into the expansion chamber 98*b* of the case 18*b*. Centrifugal force is the primary means of rotor vane extension, but conventional springs or combustion or other gas pressure may be applied to the lower vane pressure passages 28 to extend the rotor vanes 24, as required.

FIG. 4D illustrates the results of the pressure in the second volume 64 pushing the combustion piston back toward the case combustion chamber portion 92*b*. By this time, the combustion pressure in the case portion 92*b* of the combustion chamber has been reduced considerably due to the expanding gases flowing into the expansion chamber 98*b* through the rotor peripheral recess 36*b*. This expansive flow continues to rotate the rotor 20*b* due to its pressure on the rotor vane 24, i.e., the vane 24 to the upper right in FIG. 4D. The combustion pressure cannot act in the opposite direction around the rotor 20*b* due to the rotor chamber vane 110, as described further above.

As the pressure drops in the combustion chamber 92*b*, the combustion piston 48 and thus its attached compressor piston assembly 54 are pushed back toward the case combustion chamber portion 92*b* due to the pressure in the second volume 64 acting upon the larger diameter 106 annulus of the combustion piston 48, as described further above. This pressure also communicates with the hollow interior 56 of the connecting rod or shaft 52 by means of the connecting rod passages 72.

As the combustion piston 48 and compressor piston assembly 54 travel toward the case 18*b*, the space within the intake volume 66 is reduced as the compressor piston assembly 54 approaches the divider 60. The greater air pressure within the intake volume 66 relative to the compression volume 68 at this point, along with the drag of the outer sleeve 84 within the cylinder 38, causes the inner piston 76 to move away from the head or crown 86 of the outer sleeve 84, thus opening the passage 88 between the inner piston 76 and its surrounding sleeve 84 to allow a new intake charge to flow from the intake volume 66 into the compression volume 68 of the compressor module 14.

The cycle continues with the rotor 20*b* continuing to rotate, with vane 24 passing the exhaust port 100*b* and venting the expansion chamber 98*b* to the atmosphere. Next, the second combustion chamber portion 22*b* has rotated into alignment with the case combustion chamber portion 92*b* and the combustion piston 48 has reached the end of its travel toward the rotor combustion chamber portion 22*b*, as shown by returning to FIG. 4A. The compressed intake charge flows from the hollow axis 56 of the connecting rod 52, outwardly through the combustion piston outlet ports 58 behind the combustion piston head 50, through the transfer ports or passages 46 of the combustion piston sleeve 44 to bypass the piston head 50, and back into the nose opening 104 of the combustion piston 48 through the forwardly disposed combustion piston ports 58 in front of the piston head 50. As compressed air flows into the case combustion chamber 92*b*, the pressure rises within this chamber and would push the piston 48 back, closing the passages 46 from the piston outlet ports 58 if allowed to actuate over the full face of the piston 50. Thus, the nose of the piston 48 is reduced to fit a calculated orifice at the end of the combustion piston sleeve 44. This calculated area is equivalent to the annular ring defined by the outer diameter of the combustion piston 48 and the hollow connecting rod 52. The combustion chamber receives a full charge, whereupon a new ignition event occurs to continue the operation.

Figure 5:
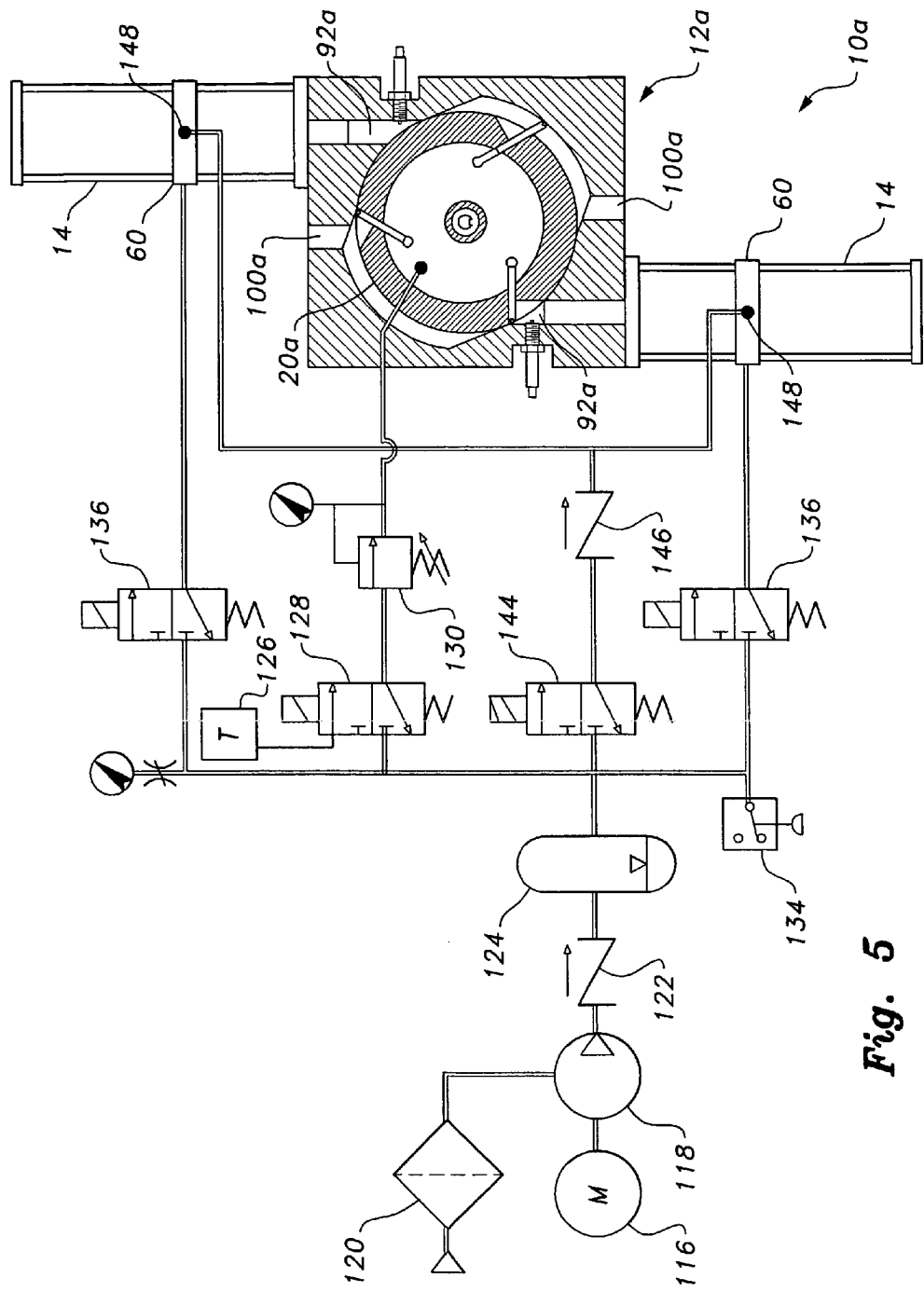
FIG. 5 is a schematic diagram of the pneumatic operating system for starting and controlling the power output of a split-chamber rotary engine according to the present invention.

It will be seen that special consideration must be given to the starting sequence for the rotary engine, as merely rotating the rotor will not provide the energy needed to operate the compressor module 14 without ignition and combustion events occurring within the rotor case. Accordingly, an exemplary starting and operating system is illustrated in FIG. 5 of the drawings, for a two compressor module engine embodiment 10a. The starting system of FIG. 5 is also an operating or control system, controlling various aspects of the engine during its operation. A motor 116 (electric, etc.) drives an air compressor 18 that draws air through a filtered inlet 120, with the compressor 118 passing the air through a check valve 122 to fill an accumulator 124. Alternatively, the engine 10a, 10b, etc. could power the compressor 118 during engine operation, with air pressure stored after shutdown until the next starting operation.

Once sufficient pressure has been raised, a timer 126 actuates a first solenoid actuated pneumatic valve 128 that supplies pressurized air through a regulator 130 to a passage(s) 132 through the side of the case (shown in FIG. 1). This pressurized air enters the rotor volume of the case between the case side plate and the recessed face 30 of the rotor (shown in FIG. 2), to enter the lower vane pressure passages 28 of the rotor and push the vanes 24 outwardly against the chamber wall of the rotor for proper sealing.

When the pressure reaches a predetermined value, a pressure actuated switch or transducer 134 actuates a plurality of second solenoid pneumatic valves 136 to open those valves and allow pressurized air to pass to the dividers 60 of the two compressor modules 14 to drive blocking or stop pins 142 outwardly from the divider 60 toward the compression piston assembly 54, thereby limiting movement of the compression piston assembly and its attached combustion piston 48 toward the combustion chamber portions of the case and rotor. Refer to FIGS. 3 through 4D for this operation. The pressurized air enters an inlet 138 in the divider 60, and thence flows to a chamber(s) 140 in the divider in back of the stop pin(s) 142. The pressurized air forces the blocking or stop pin(s) 142 outwardly, i.e., toward the compressor piston assembly 54, thus limiting the travel of the assembly 54 and its attached connecting rod 52 and combustion piston 48 toward the combustion chamber portions 22(a, b, etc.) and 92(a, b, etc.). Thus, the combustion piston cannot travel inwardly toward the case until the stop pins 142 are released, which event does not occur until the compressor modules 14 are charged with an intake air charge as described further below.

As an aside to the above blocking or stop pin operation, this portion of the starting and operating or control system will be used during operation of the engine to selectively actuate one or more compressor module(s), as required to match power demand. This has the effect of disabling that compressor module to reduce the output (and fuel consumption) of the engine. Such a power limiting system is desirable when the engine is running at lighter loads, or when idling.

Returning to FIG. 5, pressure continues to build in the reservoir 124 due to the continued operation of the motor 116 and pump 118. When full operating pressure is reached, the pressure switch 134 closes a second circuit to actuate a third pneumatic solenoid valve 144. This valve 144 opens to allow pressurized air to flow through another check valve 146 to a second volume inlet passage 148 located in the divider 60. The inlet passage 148 extends into the second volume 64 of the compressor module 14, as shown in the sectional views of FIGS. 3 through 4D. The high pressure within the second chamber or volume 64 acts on the annulus of the combustion piston 48, pushing the piston 48 toward the combustion chamber portion 92a (or 92b, etc.). As this occurs, the second pneumatic solenoid valves 136 serving to extend the compressor piston stop pins 142 are deactivated, allowing the stop pins 142 to retract in order to allow full travel of the compressor piston assembly 54. When the combustion piston 48 reaches its maximum extension into the case combustion chamber portion 92(a, b, etc.), as shown in FIG. 4A, the pressurized intake charge flows from the second volume 64 into the hollow axial passage 56 of the connecting rod 52, and thence through the combustion piston outlet ports 58 in the nose of the piston 48 and the sleeve bypass or transfer passages 46 to enter the case combustion chamber portion 92a, 92b, etc.

At this point, the pressurized air entering the case combustion chamber portion flows into either the rotor combustion chamber portion 22(a, b, etc.) if the two split chamber portions are aligned sufficiently closely with one another, or into one of the semicircumferential recesses 36 extending about the rotor, depending upon the position of the rotor within the case. Either way, the pressure causes the rotor to rotate within the case. When the rotor position is optimum for ignition, fuel is injected into the aligned combustion chamber portions and the ignition is actuated to start the engine.

Figure 7:
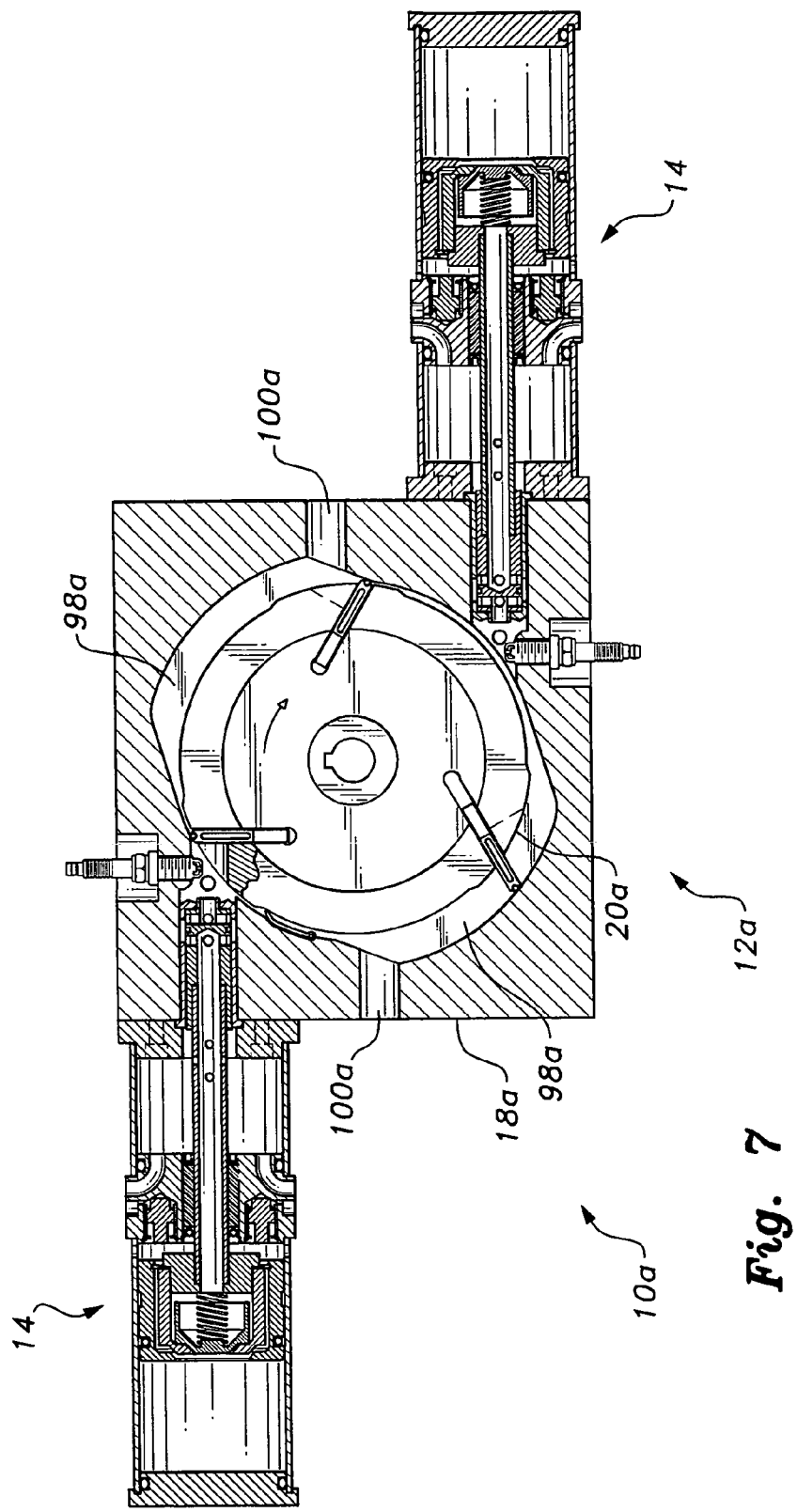
FIG. 7 is another alternative embodiment of a split-chamber rotary engine according to the present invention having two compressor modules and a rotor with three combustion chambers.

The rotary engine may have any of a wide number of different embodiments, depending upon the number of compression modules and corresponding case configuration, the number of rotor combustion chambers and rotor vanes, and the number of rows of compression and power modules assembled together. The engine 10a of FIGS. 1, 5, and 7 incorporates two compression modules 14 and a three chamber rotor 20a therein, with the rotor 20a having a corresponding number of rotor vanes. It is preferable to have a different number of rotor combustion chambers and compression modules (and therefore case combustion chambers), in order to avoid a position of singularity during the starting phase, and to avoid simultaneous combustion events. It will be seen that the three rotor combustion chamber portions of the rotor 20a result in three power pulses for each of the two compression modules during each revolution of the rotor, i.e., six power events per revolution. This is equivalent to a twelve-cylinder four-stroke cycle (Otto cycle) engine.

Figure 6:
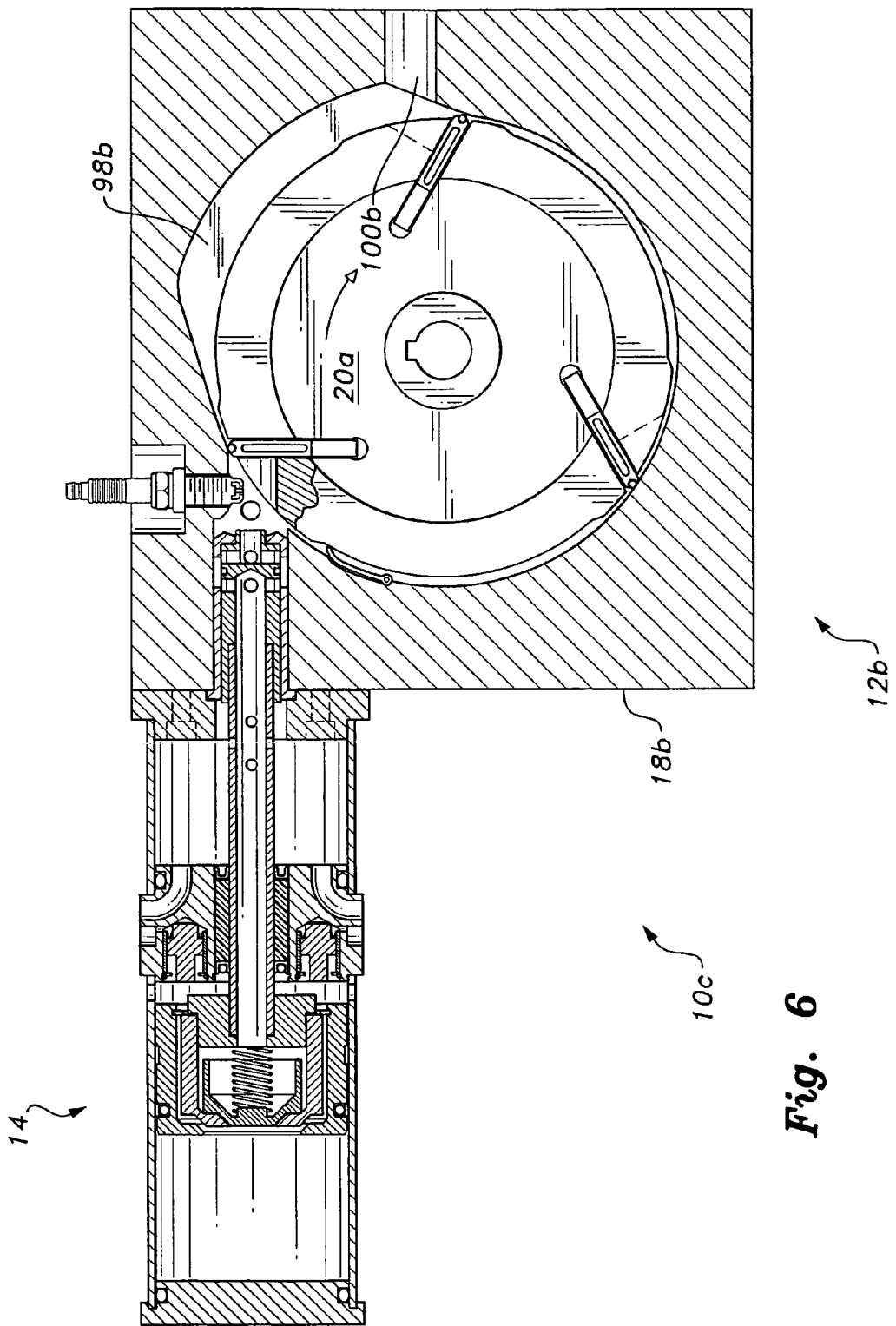
FIG. 6 is an alternative embodiment of a split-chamber rotary engine according to the present invention, with the rotor incorporating three combustion chambers supplied by a single compressor module.

FIG. 6 illustrates a cross sectional view of a rotary engine 10c having only a single compressor module 14 but including a rotor 20a with three combustion chamber portions and vanes. The case 18b may be the same as the case 20b illustrated in the sectional views of FIGS. 4A through 4D illustrating the operating principle of the engine, as only a single compression module 14 is used with this engine 10c. Such an engine produces three power events per revolution, equivalent in number to a six-cylinder Otto cycle engine.

Figure 8:
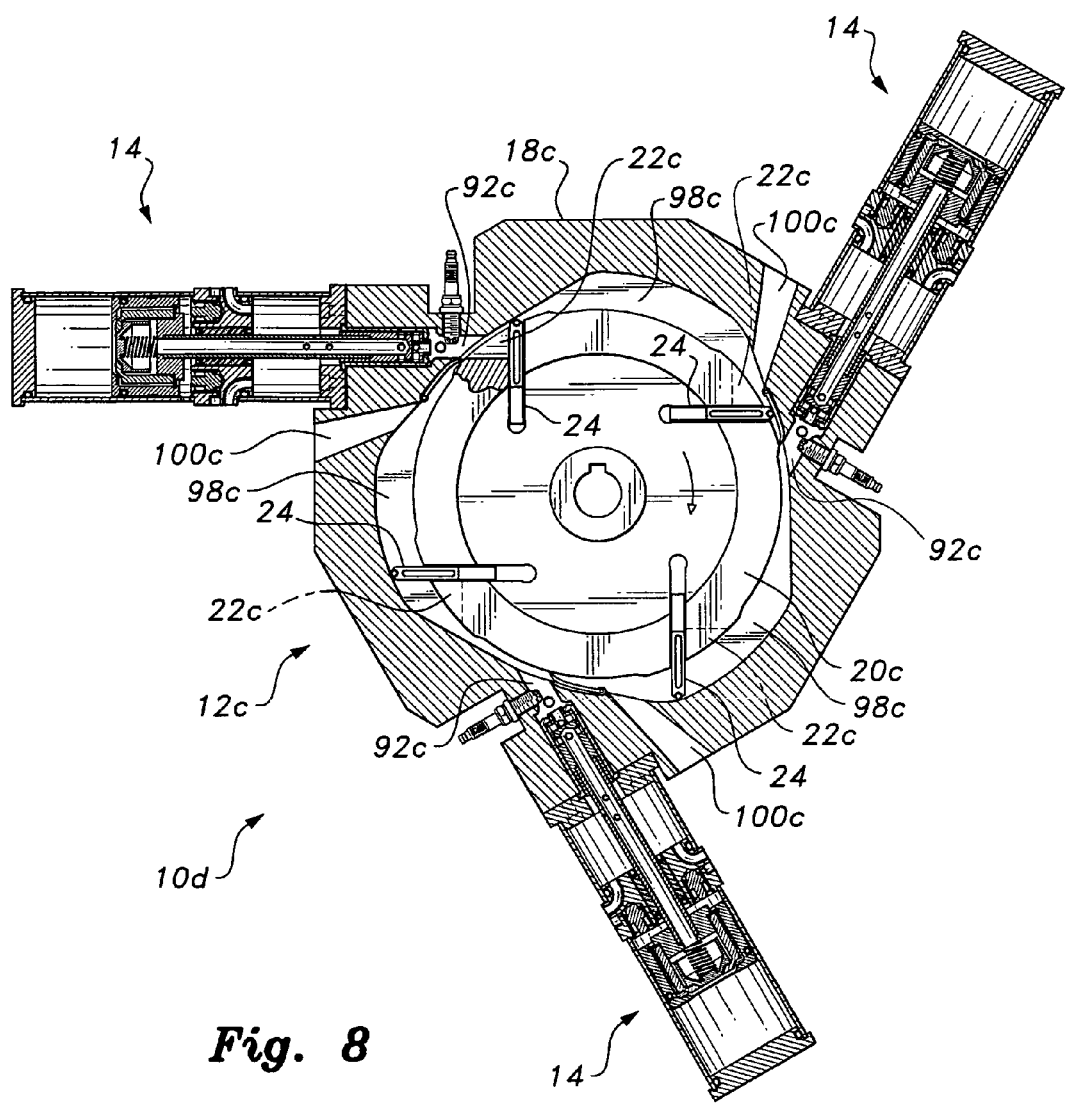
FIG. 8 is another alternative embodiment of a split-chamber rotary engine according to the present invention having three compressor modules and a rotor with four combustion chambers.

FIG. 8 provides a sectional view of a rotary engine 10d having three compressor modules evenly spaced about the power module 12c. The power module 12c includes a rotor case 18c having three case combustion chamber portions 92c, three expansion chambers 98c, and three exhaust passages 100c therein, corresponding to the number of compression modules 14. The rotor 20c includes four rotor combustion chamber portions 22c and corresponding vanes 24. It will be seen that this configuration produces four power events for each of the three compression modules 14 per each revolution of the rotor 20c, equivalent to the twelve power pulses produced by a twenty-four cylinder Otto cycle engine during each revolution. Thus, the more rotor combustion chamber portions and the more compression modules used in an embodiment of the present engine, the more power events per rotor revolution and the greater the torque. The result is a high torque, smooth running engine suitable for a vast number of different applications.

It is to be understood that the present invention is not limited to the embodiments described above, but encompasses any and all embodiments within the scope of the following claims.

I claim:

1. A split-chamber rotary engine, comprising:
   a power module having:
   a rotor case having a rotor chamber wall defining a rotor volume and at least one expansion chamber and at least one case combustion chamber disposed therein, wherein the expansion and case combustion chambers are equal in number, at least one combustion chamber piston passage extending outwardly from the at least one case combustion chamber and being substantially tangential to the rotor chamber wall, and at least one exhaust passage extending outwardly from the at least one expansion chamber;
   a combustion chamber piston disposed for reciprocation within the combustion chamber piston passage of the case; and
   a rotor disposed within the case, the rotor having at least one combustion chamber portion formed peripherally therein and being at least equal in number to the rotor case combustion chambers, the combustion chamber piston, combustion chamber piston passage of the case, and combustion chamber portion of the rotor dealing a split combustion chamber within the case; and
   at least one compressor module extending from the corresponding combustion chamber piston passage of the case, the compressor module having;
   a compressor cylinder having a case attachment end and a closed distal end opposite the case attachment end;
   a compressor piston assembly disposed within the compressor cylinder; and
   a connecting rod rigidly fixing the compressor piston assembly to the combustion chamber piston.

2. The split-chamber rotary engine according to claim 1, further comprising:
   a divider disposed generally medially within the compressor cylinder of the compressor module, the divider defining separate first and second volumes within the compressor cylinder, the compressor piston assembly being disposed within the first volume of the compressor cylinder and dividing the first volume into an intake volume and a compression volume, the connecting rod passing through the divider; and
   at least one pneumatically actuated stop pin selectively extending axially from the divider and into the intake volume of the compressor cylinder, the at least one pneumatically actuated stop pin engaging the compressor piston assembly and limiting movement of the compressor piston assembly, connecting rod, and combustion chamber piston toward the combustion chamber when the stop pin is extended from the divider.

3. The split-chamber rotary engine according to claim 2, further comprising:
   a divider disposed generally medially within the compressor cylinder of the compressor module, the divider defining separate first and second volumes within the compressor cylinder, the compressor piston assembly being disposed within the first volume of the compressor cylinder and dividing the first volume into an intake volume and a compression volume, the connecting rod passing through the divider; and
   a pneumatic starting and operating system communicating with and selectively delivering pressurized gas to the at least one pneumatically actuated stop pin of the divider within the compressor modules and to the second volume of the compressor cylinder.

4. The split-chamber rotary engine according to claim 1, further comprising:
   a divider disposed generally medially within the compressor cylinder of the compressor module, the divider defining separate first and second volumes within the compressor cylinder, the compressor piston assembly being disposed within the first volume of the compressor cylinder and dividing the first volume into an intake volume and a compression volume, the connecting rod passing through the divider; and
   a pneumatic starting and operating system communicating with and selectively delivering pressurized gas to the second volume of the compressor cylinder.

5. The split-chamber rotary engine according to claim 1, further comprising:
   a divider disposed generally medially within the compressor cylinder of the compressor module, the divider defining separate first and second volumes within the compressor cylinder, the compressor piston assembly being disposed within the first volume of the compressor cylinder and dividing the first volume into an intake volume and a compression volume, the connecting rod passing through the divider, the connecting rod further having an axial passage therethrough and at least one radial passage therethrough communicating with the second volume; and
   at least one intake port disposed through the compressor cylinder of the compressor module adjacent the divider and communicating with the intake volume of the compressor cylinder;
   wherein the compressor piston assembly comprises;
   an inner piston affixed to the connecting rod, the inner piston having a hollow interior communicating with the axial passage of the connecting rod;
   a cyclically opening poppet valve disposed concentrically in the inner piston, the poppet valve providing cyclic fluid communication from the compression volume of the compressor cylinder through the inner piston and connecting rod and into the second volume; and
   a cyclically sliding outer sleeve concentrically surrounding the inner piston, the outer sleeve cyclically providing a fluid passage between the outer sleeve and the inner piston and providing cyclic fluid communication from the intake volume to the compression volume of the compressor cylinder.

6. The split-chamber rotary engine according to claim 1, further comprising:
   at least one rotor vane disposed within the rotor and sliding along a secant of the rotor, the rotor vane defining a leading end of the combustion chamber of the rotor and further having a concave tip seal edge;
   a cylindrical roller tip seal disposed within the tip seal edge of the rotor vane, and rotating therein during engine operation; and
   at least one chamber vane extending flexibly from the chamber wall and having a rotor contact edge.

7. The split-chamber rotary engine according to claim 1, further comprising:
   a plurality of combustion chamber portions disposed about the rotor; and
   a plurality of rotor vanes disposed within the rotor and slidably extending therefrom, each of the rotor vanes defining a leading end of the combustion chamber of the rotor and further having a chamber wall contact edge.

8. The split-chamber rotary engine according to claim 1, further comprising a plurality of compressor modules extending from the corresponding combustion chamber piston passage of the case.

9. A rotary engine, comprising:
a power module having:
a case having a rotor chamber wall defining a rotor volume and at least one expansion chamber disposed therein, at least one combustion chamber piston passage extending outwardly from the rotor volume, and at least one exhaust passage extending outwardly from the rotor volume;
a combustion chamber piston disposed for reciprocation within the combustion chamber piston passage of the case; and
a rotor disposed within the case, the rotor having at least one combustion chamber portion formed peripherally therein, the combustion chamber piston, combustion chamber piston passage of the case, and combustion chamber portion of the rotor defining a combustion chamber within the case; and
at least one compressor module extending from the case, the compressor module having:
a compressor cylinder having a case attachment end and a closed distal end opposite the case attachment end;
a divider disposed generally medially within the compressor cylinder, the divider and cylinder defining separate first and second volumes within the compressor cylinder;
a compressor piston assembly disposed within the first volume of the compressor cylinder, the piston assembly dividing the first volume into an intake volume and a compression volume;
a connecting rod passing through the divider and rigidly fixing the compressor piston assembly to the combustion chamber piston; and
at least one pneumatically actuated stop pin selectively extending axially from the divider and into the intake volume of the compressor cylinder, the at least one pneumatically actuated stop pin engaging the compressor piston assembly and limiting movement of the compressor piston assembly, connecting rod, and combustion chamber piston toward the combustion chamber when the stop pin is extended from the divider.

10. The rotary engine according to claim 9, further comprising a pneumatic starting and operating system communicating with and selectively delivering pressurized gas to the second volume of the compressor cylinder.

11. The rotary engine according to claim 9, further comprising at least one intake port disposed through the compressor cylinder of the compressor module adjacent the divider and communicating with the intake volume of the compressor cylinder, wherein:
the connecting rod has an axial passage therethrough and at least one radial passage therethrough communicating with the second volume; and
the compressor piston assembly comprises;
an inner piston affixed to the connecting rod, the inner piston having a hollow interior communicating with the axial passage of the connecting rod;
a cyclically opening poppet valve disposed concentrically in the inner piston, the poppet valve providing cyclic fluid communication from the compression volume of the compressor cylinder through the inner piston and connecting rod into the second volume; and
a cyclically sliding outer sleeve concentrically surrounding the inner piston, the outer sleeve cyclically providing a fluid passage between the outer sleeve and the inner piston and providing cyclic fluid communication from the intake volume to the compression volume of the compressor cylinder.

12. The rotary engine according to claim 9, further comprising:
at least one rotor vane disposed within the rotor and sliding along a secant of the rotor, the rotor vane defining a leading end of the combustion chamber of the rotor and further having a concave tip seal edge;
a cylindrical roller tip seal disposed within the tip seal edge of the rotor vane, and rotating therein during engine operation; and
at least one chamber vane extending flexibly from the chamber wall and having a rotor contact edge.

13. The rotary engine according to claim 9, wherein a plurality of combustion chamber portions are disposed about the rotor, the rotary engine further comprising a plurality of rotor vanes disposed within the rotor and slidably extending therefrom, each of the rotor vanes defining a leading end of the combustion chamber of the rotor and further having a chamber wall contact edge.

14. The rotary engine with separate compression and power modules according to claim 9, further comprising a plurality of compressor modules, each of the compressor modules extending from the corresponding combustion chamber piston passage of the case.

15. A rotary engine, comprising:
a power module, comprising:
a case having a rotor chamber wall defining a rotor volume and at least one expansion chamber disposed therein, at least one combustion chamber piston passage extending outwardly from the rotor volume, and at least one exhaust passage extending outwardly from the rotor volume;
a combustion chamber piston disposed for reciprocation within the combustion chamber piston passage of the case;
a rotor disposed within the case, the rotor having at least one combustion chamber portion formed peripherally therein, the combustion chamber piston, combustion chamber piston passage of the case, and combustion chamber portion of the rotor defining a combustion chamber within the case; and
at least one compressor module extending from the case, the compressor module having:
a compressor cylinder having a case attachment end and a closed distal end opposite the case attachment end;
a divider disposed generally medially within the compressor cylinder, the divider and compressor cylinder defining separate first and second volumes within the cylinder;
a compressor piston assembly disposed within the first volume of the compressor cylinder, the piston assembly dividing the first volume into an intake volume and a compression volume;
a connecting rod passing through the divider, the connecting rod rigidly fixing the compressor piston assembly to the combustion chamber piston; and
a pneumatic starting and operating system communicating with, and selectively delivering pressurized gas to, the second volume of the compressor cylinder.

16. The rotary engine according to claim 15, further comprising at least one pneumatically actuated stop pin selectively extending axially from the divider and into the intake volume of the compressor cylinder, the at least one pneumatically actuated stop pin engaging the compressor piston assembly and precluding movement of the compressor piston assembly, connecting rod, and combustion chamber piston toward the combustion chamber when the stop pin is extended from the divider.

17. The rotary engine according to claim 15, further comprising at least one intake port disposed through the compressor cylinder of the compressor module, adjacent the divider and communicating with the intake volume of the compressor cylinder, and wherein:
  the connecting rod has an axial passage therethrough and at least one radial passage therethrough communicating with the second volume; and
  the compressor piston assembly comprises;
  an inner piston affixed to the connecting rod, the inner piston having a hollow interior communicating with the axial passage of the connecting rod;
  a cyclically opening poppet valve disposed concentrically in the inner piston, the poppet valve providing cyclic fluid communication from the compression volume of the compressor cylinder, through the inner piston and connecting rod, and into the second volume; and
  a cyclically sliding outer piston concentrically surrounding the inner piston, the outer piston cyclically providing a fluid passage between the outer piston and the inner piston and providing cyclic fluid communication from the intake volume to the compression volume of the compressor cylinder.

18. The rotary engine according to claim 15, further comprising:
  at least one rotor vane disposed within the rotor and sliding along a secant of the rotor, the rotor vane defining a leading end of the combustion chamber of the rotor and further having a concave tip seal edge;
  a cylindrical roller tip seal disposed within the tip seal edge of the rotor vane, and rotating therein during engine operation; and
  at least one chamber vane extending flexibly from the chamber wall and having a rotor contact edge.

19. The rotary engine according to claim 15, further comprising:
  a plurality of combustion chamber portions disposed about the rotor; and
  a plurality of rotor vanes disposed within the rotor and slidably extending therefrom, each of the rotor vanes defining a leading end of the combustion chamber of the rotor and further having a chamber wall contact edge.

20. The rotary engine according to claim 15, further comprising a plurality of compressor modules extending from the corresponding combustion chamber piston passages of the case.

* * * * *